US006898553B2

United States Patent
Minucciani et al.

(10) Patent No.: US 6,898,553 B2
(45) Date of Patent: May 24, 2005

(54) METHOD FOR IDENTIFICATION AND MANAGEMENT OF ERRORS AND DEFECTS IN ASSEMBLY AND WELDING LINES FOR AUTOMOTIVE VEHICLE BODIES AND BODY PARTS OR THE LIKE AND PLANT IN ACCORDANCE WITH SAID METHOD

(75) Inventors: Giorgio Minucciani, Moncalieri (IT); Antonio Recupero, Turin (IT); Maurizio Ercole, Turin (IT)

(73) Assignees: Advanced Techologies S.r.l., Pianezza (IT); DEA S.p.A., Moncalieri (IT)

( * ) Notice: Subject to any disclaimer, the term of this patent is extended or adjusted under 35 U.S.C. 154(b) by 34 days.

(21) Appl. No.: 10/676,080

(22) Filed: Oct. 2, 2003

(65) Prior Publication Data

US 2004/0068341 A1 Apr. 8, 2004

(30) Foreign Application Priority Data

Oct. 4, 2002 (IT) .................................... MI2002A2109

(51) Int. Cl.$^7$ ............................................... G01L 1/00
(52) U.S. Cl. .................... 702/182; 29/407.08; 700/110; 702/42
(58) Field of Search ............................. 702/33, 35, 41, 702/42, 182, 183, 184, 185; 700/79, 95, 108, 110, 114, 117, 118, 195; 29/796, 407.01, 407.02, 407.03, 407.08, 430, 711, 791, 792, 771; 33/553, 554; 73/865.3, 865.4, 865.8, 865.9, 866; 198/339.1, 345.1, 346.1, 346.2

(56) References Cited

U.S. PATENT DOCUMENTS

| 4,894,908 | A | * | 1/1990 | Haba et al. .................... 29/711 |
| 5,159,844 | A | * | 11/1992 | Alborante ................... 73/865.9 |
| 5,166,874 | A | * | 11/1992 | Nomaru et al. ............... 700/79 |
| 5,341,304 | A | * | 8/1994 | Sakamoto et al. .......... 700/110 |
| 5,347,700 | A | * | 9/1994 | Tominaga et al. ............ 29/430 |
| 5,380,975 | A | * | 1/1995 | Sato et al. ............... 219/69.18 |
| 6,421,893 | B1 | * | 7/2002 | Katayama et al. .......... 29/33 K |
| 6,467,675 | B1 | * | 10/2002 | Ozaku et al. ............... 228/175 |
| 6,510,357 | B1 | * | 1/2003 | Naik et al. .................... 700/98 |
| 6,691,392 | B2 | * | 2/2004 | Savoy et al. ............. 29/407.09 |

* cited by examiner

Primary Examiner—Carol S. W. Tsai
(74) Attorney, Agent, or Firm—Jacobson Holman PLLC

(57) ABSTRACT

A plant is made up of a plurality of automatic stations for the performance of an assembly process of body parts or the like with there being in the stations automatic support and blocking means for the parts to be assembled and automatic assembly means for the parts supported and blocked and comprising in the stations measurement sensors in established measurement points for measurement of geometrical magnitudes of the parts in assembly with the measurement data taken by the sensors being received by a processing unit which takes any deformations of the parts in the various stations and goes back from the detected deformations to the causes thereof in the asembly process and emits a diagnosis signal of the presumed cause.

15 Claims, 1 Drawing Sheet

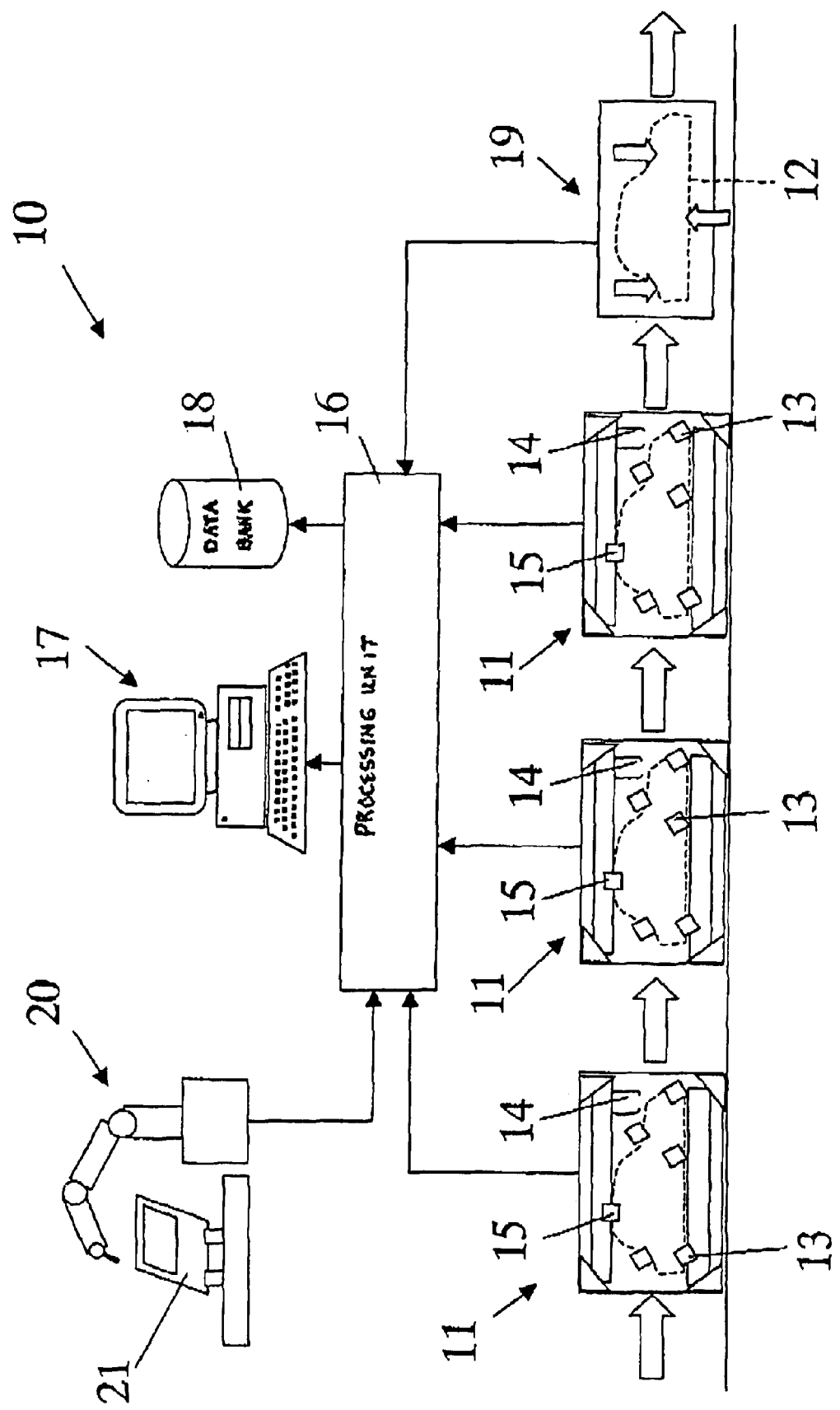

METHOD FOR IDENTIFICATION AND MANAGEMENT OF ERRORS AND DEFECTS IN ASSEMBLY AND WELDING LINES FOR AUTOMOTIVE VEHICLE BODIES AND BODY PARTS OR THE LIKE AND PLANT IN ACCORDANCE WITH SAID METHOD

BACKGROUND OF THE INVENTION

1. Field of the Invention

The present invention relates to a method for identification and management of errors and defects in assembly and welding lines for automotive vehicle bodies and body parts or the like. In particular the management concerns diagnosis and if necessary therapy of defects. The present invention also relates to a plant in accordance with said method.

2. State of the Prior Art

In the prior art, production lines for bodies and body parts made up of a plurality of automated precision assembly stations comprising a structure bearing a plurality of blocking inserts for mutual positioning of the parts to be assembled are well known. Assembly devices, for example articulated robot welding arms, fasten together permanently the parts positioned by the inserts and the finished product is then extracted from the station to pass to the following stations. Assembly can be accomplished by welding, gluing, riveting, seaming et cetera depending on specific requirements.

One of the more important problems met with on such lines is to ensure dimensional correctness of the product realized. Indeed, various factors contribute to making the object produced unlike the desired object. Degrading factors can be for example peculiar to the assembly technique used or due to geometrical changes occurring after the initial setting of one or more stations. For example, with assembly by welding, variations or drifting of the welding parameters such as those due to the consumption of the electrode, variation of the electrical current or welding time, change in position or sequence of performance of the welding points et cetera can occur. Similar factors can also be traced for the other assembly methods.

Geometrical variations can also be caused by maintenance work and/or adjustment of the stations, wear of movement parts or even variation of physical parameters of the parts being assembled (changes of composition, thickness, shape et cetera of the parts to be assembled). Typical is change of the thickness of parts pressed from sheet metal with change of the production lot.

To seek to reduce the number of defective products, sampling is usually done in the prior art by taking at intervals an article at the end of the line and inspecting it in special measuring stations to find the deviations from the "ideal" shape. If defects beyond the tolerable limits are found the line or part thereof is stopped and it is sought to trace back to the station or stations which produced the defect to then trace the cause of the defect within the station or stations thus identified. Lastly, the necessary corrective action is taken.

With such a manner of proceeding however, a certain number of defective articles are inevitably produced before the defect is found. Among other things, this involves waste of even complex parts already having passed through various perfectly successful processes and therefore perfectly acceptable up to the time of their assembly in the defective station. In addition, seeking the cause of the defect and its elimination require much time with resulting high costs of plant shutdown.

The general purpose of the present invention is to remedy the above mentioned shortcomings by making available a method and plant allowing efficient identification of errors, going back rapidly to the specific causes and, if necessary, information useful for their rapid and practical resolution.

SUMMARY OF THE INVENTION

In view of this purpose it was sought to provide in accordance with the present invention a plant made up of a plurality of automated stations for the performance of an assembly process for body parts or the like with there being in the stations automatic means for support and blocking of the parts to be assembled and automatic assembly means for the supported and blocked parts and a method for identification and management of errors and defects which method comprises steps of preliminary analysis with the steps of determining measurement points sensitive to the movements of constraint points which comprise support and blocking points for the parts in the stations, determining correlations between measurements detectable in said measurement points sensitive to said movements, and possible causes which might generate such movements, and inline diagnostic steps comprising the steps of overseeing any movements in the previously ascertained measurement points and in this case going back to the possible causes of the movements and signaling such possible causes to allow their elimination if desired or necessary.

In addition, if it is thought to realize a plant made up of a plurality of automatic stations for the performance of an assembly process of body parts or the like with there being in the stations automatic support and blocking means for the parts to be assembled and automatic assembly means for the supported and blocked parts and comprising in the stations sensors for measurement in established detection points for measurement of geometrical magnitudes of the parts in assembly with the measurement data taken by the sensors being received by a processing unit which detects any deformations of the parts in the various stations and goes back from the detected deformations to the causes thereof in the assembly process and emits diagnosis signals of the presumed cause thereof.

BRIEF DESCRIPTION OF THE DRAWING

To clarify the explanation of the innovative principles of the present invention and its advantages compared with the prior art there is described below with the aid of the only annexed drawing a possible embodiment thereof by way of non-limiting example applying said principles.

DETAILED DESCRIPTION OF THE INVENTION

With reference to the figure a plant realized in accordance with the present invention and designated as a whole by reference number 10 is shown diagrammatically. In the plant there is a plurality of stations 11 each of which performs specific steps of a process for the realization of an assembled part or body 12 of an automotive vehicle. The various steps can be welding, riveting, gluing et cetera of body parts to achieve the desired product. The structure and assembly means of the various stations are not further shown as they are known and readily imaginable to those skilled in the art.

Each station comprises known blocking inserts 13 for mutual positioning of the parts to be assembled and known assembly devices 14 (for example welding robots) which fasten the various body parts permanently.

As clarified below, in each station there is a plurality of sensors 15 which detect (in accordance with the description below) the position of points of the body parts in the station.

The measurements taken in the stations are all gathered in a processing system or unit 16 which processes the data and displays them on a terminal 17 in addition to memorizing them in an orderly manner in a data bank 18.

In addition to the sensors in the assembly stations, at the end of the line there can be a known measurement station 19 for detecting a certain number of dimensional parameters on the article.

As clarified below, the actual diagnosis consists of ascertaining the point of the production process in which lies the cause of an anomaly ("location of the anomaly along the process"). Locating is both at the processing station level (for example "the cause acts in the geometry station of body no. 120") and in the processing step (for example "the cause acts in the welding step"). The point on the part in which the anomaly acts ("locating the anomaly along the part") must also be identified.

Locating tends to put the part in relation with the equipment (for example "the cause lies in nearness of the inserts 25 and 26") or with other parts to which it couples (for example "the cause lies along the coupling surface of the side with the floor"). Lastly, the nature of the cause which generated the anomaly ("definition of the nature of the anomaly or pathology") must be identified.

Locating the cause along the process can be made complicated by the fact that in some cases, due to the error multiplication factor the phenomenon appears clearly only much further down stream from the point where it was generated. For example, certain processing errors of the floor can appear only when coupling with the sides in the body geometry stations is performed.

Locating the cause along the part can present similar problems. In this case it is necessary to differentiate the point where the cause lies in relation to the points which suffer only from the effects of said cause. This is true in particular when the anomaly appears in different points of the part but depends on a single cause. Similarly to the above case, the errors can be more obvious at points far from the cause than in close points. For example, floor errors, hence in the lower part of the body, can be made more obvious on the roof and hence in the higher part of the body due to a "lever" effect produced by the resulting errors of positioning of the body sides.

In accordance with the present invention, to use structural analysis for diagnostic and corrective functions, a preliminary step is advantageously performed comprising identification of the measurement points sensitive to movements of support and blocking points in the various stations and sensitive to possible causes of simulatable movement and the creation of a simplified matrix constructed on the constraint and measurement points with very fast resolution and hence suitable for performing inline search operations by trial and error. The correlations between movement detected and possible causes which generated them can thus be ascertained.

The correlations and linear regressions to determine which are the points "sensitive" to possible corrective actions are then used. The linear regressions must also be used to determine the variations of spring-back following corrections on the support and blocking points in the stations.

The first step in creation of a simplified matrix for inline search operations by trial and error takes place by utilizing known structural analysis concepts.

Normal use of structural analysis however consists of obtaining the deformations deriving from certain stresses. This way of operating can be called "direct procedure".

For the purposes of the present invention however it is necessary to perform a "reverse procedure", that is to say which allows tracing back from the deformations detected experimentally to the stresses which caused them. A possible procedure could be in this case to operate by trial and error, i.e. apply to the mathematical model all possible stresses and determine which of the stresses applied are those which give deformations which come closest to the deformations actually detected at the measurement points. The possible stress combinations are however very many and the time for calculating each structural analysis is rather long. This makes this method impracticable in a real application.

In accordance with the principles of the present invention the mathematical structural model of the parts being processed is done by using conventional techniques and thus obtaining what might be defined "a complete structural model". From the complete model is then taken a "simplified structural model" in which the nodes are reduced at the points of constraint and stress application (for example, the references and blocking inserts in the stations) and at the reading points of the measurement sensors just of the processing stations. With known techniques this simplified model can be advantageously reduced further to obtain a very simple matrix calculable with high rapidity.

The above mentioned "trial and error" method is then applied to the simplified model so as to find the stresses on the blocks which cause the deformations detected inline on the measurement points. The trial and error search operation can be easily studied to reduce the number of processings. This fact together with the great speed of calculation of the matrix makes the method perfectly practicable.

In particular, the trial and error solution method is used for diagnostic operations in which, given a certain distribution of real deformations detected, the point of stress which generates it and the extent of said stress are taken, and for correction (or "therapy") operations in which, given a certain distribution of real deformations detected, the distribution of the stresses which might be applied to compensate for said deformations is obtained. Normally the above mentioned therapy operation leads to endless solutions because the stress points are more numerous than the measurement points. But these degrees of freedom can be used for seeking among the endless possible solutions those which optimize certain parameters (termed "optimization criteria") which can be chosen for example depending on specific requirements of operational or quality desires. For example it might be desired to minimize the residual deformations after the correction, minimize the number of correction stresses to be used, minimize the overall amount of corrective stresses to be applied, or minimize the internal tensions induced by the corrective stresses et cetera.

The points at which the deformations are detected must be chosen so as to optimize the definition of the constraint or stress points (for example the inserts) which generate the deformations either for diagnosis operations or therapy operations.

This requires that the points be "sensitive" to small movements of the inserts i.e. that the points change geometry with changes in the position of the inserts and that the individual points be suited to differentiation of the various causes simulated.

To achieve this in accordance with the present invention the structural model of the part is used to determine the "zones" (defined by a series of points) of sensitivity for each simulatable cause of stress (for example the position of the inserts) and possible combinations thereof.

The "zones" thus defined are then differentiated in relation to the causes associated with them and the "trial and error" method is applied to the differentiated zones in order to define the optimal measurement points. This procedure consists of positioning the sensors virtually in the "zones" previously differentiated and calculating the number of causes detectable.

Simulating all the possible sensor displacements, the optimal solution constituted by the complex of sensors which ensures maximization of the number of causes detectable and minimization of the number of sensors used can be defined.

The results thus obtained are then used to define the simulated causes which can be differentiated (normally all) and the correlations between chosen "zones" and causes, understood as bijective association between combinations of measured values, expressed as all or nothing (1 or 0) with respect to certain thresholds, and relative cause.

At this point the "signatures" of the various causes of possible defects can be obtained, i.e. the profiles of the normalized effects on all the measurements taken.

During normal functioning of the system it can also be decided to use a number of sensors smaller than the number of sensors necessary to differentiate all the possible causes. In this case the real causes which can be differentiated can be less in number than those simulated. In any case the system can indicate the differentiatable causes accompanied by all the parameters mentioned above and also indicate the undifferentiatable causes accompanied by the respective signatures.

To realize some diagnostic and corrective functions some statistical calculation concepts are used.

Normally in the automotive sheet metal welding stations it is attempted to compensate for deviations or geometrical errors of various kinds by moving the position of the blocking inserts. With these movements—which take the inserts "out of geometry" i.e. outside nominal values—internal tensions are induced in the part being processed at the time of blocking. Normally it is not desired that such tensions be such as to induce in the material permanent plastic deformations. Therefore, under normal conditions i.e. in "linear" regime, the spring-back upon unblocking takes back the part into the original conditions without introducing any compensation.

To have "permanent" corrections, i.e. which are held even after unblocking the part, "nonlinear" operations must intervene in the production cycle which takes place between blocking and unblocking of the part. In the case of welding, discarding the nonlinear operations of plastic deformation as mentioned above, the nonlinear operations consist of relative movements (running and striking movements) of the sheet metal of the parts to be assembled upon blocking which are subsequently "frozen" by the welding operations. If these relative movements are influenced by the position of the blockings, movement of the relative inserts results in permanent corrections. The points to which these permanent corrections correspond are defined here "sensitive points".

The problem is to determine these sensitive points.

The present invention also sets out to determine the "sensitive points" of a certain welding process on the basis of statistical processing without requiring physical movement of the blockings, normally a delicate and costly operation. To determine these points which are based here on the consideration that due to the effect of dispersal of the shapes and positions of the parts coming in there are many combinations between geometry of the part and geometry of the inserts usable at the statistic level.

One proceeds with examination of the trend of the dispersal of the geometrical errors at the input and output of the welding cycle under examination. Of these dispersals one then examines the "correlation" and the "linear regression line" between input and output. If the correlation is high (close to 1) and the regression line has a slope near 45° (angular coefficient near 1) it means that the production process gives back the part at output unchanged from how it appeared at input, regardless of the relative position of the part with respect to the blocking. Under these conditions the point "is not sensitive". On the contrary, the points are as much more "sensitive" as the correlation between input and output is lower and as much further the linear regression line slope is from 45°.

The "sensitive" points thus defined allow making permanent corrections but are in any case affected by spring-backs which reduce the effectiveness of the correction. In other terms, to obtain the desired result the corrective action of the eroded part must be increased by the spring-back variations which occur between the situation before and after the correction.

It is therefore necessary at this point to define the law of variation of the spring-back of a point of the part between input and output of a welding station as a function of the variation of the relative position between the blocking insert and the part. This is to define the adjustments of the movements of the blocking inserts necessary for taking corrective actions on measured points. This can be based on the same statistical considerations seen in the previous point.

In this case also it is desired to make an evaluation on the basis of statistical analyses without requiring physical movement of the blocks. One therefore xamines the trend of the dispersal of the geometrical errors at the input and output of the welding cycle in question. Of these dispersals one then examines the "linear regression line" between input and output. The inclination of said line identifies the movement part which is eroded by the spring-back variation. In other words, letting "s" be movement of the insert, "x" measurement at input, "y" measurement at output and "m" the angular coefficient of the regression line, we have:

$$y = s - m \cdot s$$

from which is derived:

$$s = y/(1-m)$$

Therefore the movement s which is to be given to the insert to correct an error at output y must be changed by a factor $1/(1-m)$. This factor tends towards 1 (no adjustment) for m tending to 0 and tends to the endless (correction impossible) for m tending to 1, i.e. for inclination of the regression line tending to 45°. All this is coherent with the definition of "sensitivity" seen above.

Until now it has been assumed that all the necessary measurement data used for diagnosis as mentioned above come from a single measurement system so that they are correlated and coherent with each other and can therefore be used directly.

In reality the data will come from different work stations and different measurement systems. Advantageously, the metrology (i.e. the dimensional characteristics measurement and reading systems which it is desired to watch) is distributed along the process (advantageously fitted directly in the equipment of the various stations so as to be able to measure during all the welding operations also without requiring dedicated space) and concentrated at line end (for example realized with measurement machines with coordinates of the DEA type).

Normally the data taken by different systems are not metrologically coherent i.e. they are not directly comparable for various reasons. In our specific case it must be considered that the sheet metal parts assemblies to be measured are frequently very flexible and it therefore happens that between the various stations the measurements are not homogeneous because in each work station the parts are reported differently, have a layout different from vertical and therefore with different deformations due to the effect of the weight force and lastly are deformed differently due to the effect of different ways of supporting and blocking them.

For correct use of the series of data coming from different readings it is necessary to "correlate" the data together, i.e. find the laws which allow passing from data measured with one system to data measured with another. In other words, it is necessary to eliminate the differences which do not depend on the real dimensions of the parts but on the manner in which they are measured. It is therefore necessary to determine the laws of transformation from one reading system to the other at least for the three above mentioned causes of incoherence.

For parts reported in a different way, normally in dimensional metrology the transformation of references is done on the basis of the absolute position thereof. In our case of diagnostic application the system is scarcely usable because the references can be affected by errors (also subject to diagnosis) and because during measurement the part can be supported not on its reference points but on other points known with slight precision as happens, for example, when it is seized by handling members.

A different approach consisting of accomplishing a "best fitting" processing (consisting of the search for the rototranslation of the part which minimizes the residual errors) on the data coming from both the reading systems it is wished to compare was preferred. If the best fitting is done on the same points the final references of the two sets of data will coincide regardless of the references used for their original measurement.

for the problem of parts with trim different from the vertical it was innovatively chosen to use structural analysis to ascertain the differences due to deformations linked to the weight forces acting differently in the two cases.

Lastly, the problem of errors due to parts deformed in a different manner due to the effect of different manners of holding and blocking them can be divided for convenience into two sub-cases.

The first case is that in which the part is held isostatically. In this case the variations are due only to different effects of the weight forces and the solution is analogous to that of the preceding case.

The second case is that in which the part is held and blocked hyperstatically. In this case, in addition to the variations due to different effects of the weight forces and quantifiable as in the previous case, allowance must be made for deformations induced by the blocking.

In all cases, thanks to the use of structurally analysis concepts, variations induced by blocking can be ascertained by allowing for real geometry (to be ascertained with other systems) of the parts and blocking members.

A first example of the use of correlated metrological data coming from different reading systems is that of the so-called "process signature".

For diagnostic purposes it is very important to locate the onset of the anomaly and consequently its cause. Location must determine the point of the process, the step of the processing cycle and the point of the part in which the anomaly appears.

The metrology distributed along the process which generates a signaling where the anomaly starts to appear provides for this. However, the anomaly does not always appear simply as a deviation from zero error. Indeed, normally in processes such as those of automobile sheet metal work, to obtain zero error on the finished product it is normal to have certain deviations from zero in certain points of the process and of the part which are subsequently compensated for and nullified.

This is because it is not always possible to eliminate the error where it is born, for example in the pressing step, and furthermore it is not possible to have "zero internal tensions" everywhere and therefore internal "coaction" states with resulting variations in shape which evolve along the process must be accepted and managed.

In other words, it is normal to have errors along the process which are nullified later. The geometry of the parts at input and of the semifinished parts evolves along the processing lines as a result of the variations in rigidity and in the internal coaction states caused by the mechanical shrinkage and thermal stresses which occur along the processing line.

It should also be considered that the geometry of the parts and the geometry of the support and blocking equipment differ due to the springing-back of the sheet metal.

Lastly, from a strictly metrological point of view the geometrical readings on the semifinished parts do not coincide with those on the finished products as a result of the different conditions under which the measurements are usually made.

It is therefore not efficient to signal some types of error immediately and reject parts on the basis thereof at the same time they are detected.

Along the process the evolution of the deviations from the nominal value of a certain point which begins in the part at input continues in the semifinished parts in their various stages of progress and ends in the finished part constitutes the "process signature" at that point. The name comes from the fact that every process and every point have their typical evolution which distinguishes them.

If we define the typical trend of the systematic errors along the process as "process signature" (the signature is characteristic for each plant), we can define as "zero signature" the process signature which leads to having zero errors on the final part. This is never completely "flat" even if this situation constitutes the intended objective since it is one of the conditions of the ideal "zero tension" process.

The zero signature is all equal to zero ("flat zero signature") only in the extreme case of "zero tension process" which constitutes an ideal situation never completely realizable but which it is well to prepare.

The "zero signature" is obtained by correlation between data measured along the line ("distributed metrology") and data measured at line end ("certification or audit concentrated metrology"). Obtaining the signature is a typically statistical operation calculated on the systematic values. The actual signature is then taken inline and its deviations from the zero signature are used to ascertain the process points having anomalous behavior (anomaly location).

A second example of use of correlated metrological data coming from different reading systems is that of decomposition and recomposition of the figures in the operations of distinguishing of the position and shape errors.

Indeed, one of the important objectives of the diagnosis is to distinguish the causes of anomalies which translate into local shape errors—for example generated upon pressing the sheet metal—and the causes of anomalies which translate into mutual position errors of assembled parts, for example generated by incorrect welding operations.

It its therefore appropriate to reconstruct the geometry of the real part with the greatest possible completeness and then use all the available reading sources while also allowing for their complementariness. In accordance with the present invention the real geometry of the part is reconstructed here by "sewing" the data which describe the local errors of shape to the data describing the general geometry deriving from the manner of connecting the parts. To do this, the following method in three steps is followed advantageously.

In the first step the local shape data are read, if necessary focusing on critical measurement zones the measurements made with flexible reading systems 20, for example with coordinate measurement machines or anthropomorphous measurement robots. The measurements are made on parts 21 which constitute subassemblies of the parts which are realized by the assembly of parts 21 until the product or final part 12 is realized.

In the second step the general data of the coupling geometry of the parts are read with inline machines with very high sampling, for example with known parallel measurement systems which comprise or are the sensor systems 15 of the stations.

In the third step the data are sent to the processing unit 16 and the general geometry reconstruction is done by the latter by known structural analysis using as starting geometrical data the local shape error data taken in the first step and as constraints the part positioning data taken in the second step.

It is now clear that thanks to the system and method discussed herein it is possible to appropriately answer the following questions:

the product is satisfactory, therefore the process functions correctly, or (if the process does not function satisfactorily) where and why doesn't it function well?

if the process does not function satisfactorily, how to remedy it (therapy)? and what are the effects of the simulated remedies before taking the wrong actions (prognosis)?

In application of the therapy (i.e. correction of the process) there will be a first step during which the following preliminary operations will be accomplished:

ascertaining the sensitive zones understood as areas in which it is possible to correct the part permanently by action on the position of the blocking inserts in the station or stations, ascertaining zones of possible corrective action (sensitive areas with significant errors), and ascertaining the adjustments necessary in definition of the movements of the inserts to allow for spring-back variations resulting from the action.

After the preliminary operations the first step of the therapy continues with identification of the movements of the inserts, i.e. with identification of the inserts to be moved and the amount of the movement as a function of preset final precision objectives.

In identification of the movements of the inserts two different therapy strategies can be applied which can be indicated as curative therapy, i.e. therapies which tend to remove the cause of the defect, and compensative therapies, i.e. therapies which tend to compensate for the effect even without knowing the cause of the defect when it is not possible or appropriate to take action where the cause arises (for example compensation in the assembly station of shape errors of the parts due to pressing).

In application of a curative therapy the system identifies the "out of place" insert and indicates the correction to be made on it.

In compensative therapy, the system (for example after the operator has indicated the maximum residual error it is wished to obtain) identifies the minimum number of inserts to be moved and chooses the inserts on which to act so as to obtain the result with the minimum movement, indicates the movements to be made and lastly indicates the residual errors after the correction.

The prognosis realized by the system, i.e. simulation of the effects of the correction proposed, makes it possible to check the good outcome of the operation before making costly physical operations.

With the system in accordance with the present invention various functions covering all the requirements of management of the plant can be obtained. There are thus:

supervision and control functions in accordance with which the system supplies to the operator a thorough of the functioning of the process updated in real time at the general synthesis and detailed analysis levels, monitoring and alarm functions in accordance with which the system constantly keeps the process under control in all its points to automatically call the attention of the operator if anomalies arise, diagnosis and therapy functions in accordance with which the system in case of occurrence of anomalies locates the cause, suggests corrective action and checks their effectiveness, product quality control functions in accordance with which the system keeps all the quality data of the product constantly under control and signals the existence of any points outside tolerance, and functions of optimization of the process in accordance with which the system supplies an aimed analysis of the error attributable to the individual elementary operations of the process if it is desired to improve general performance.

Of all the significant events occurring during the life of the plant and which are detected by the system, historical data for statistical and documentation purposes can of course be collected.

The advantages of a method and a system in accordance with the present invention are innumerable. For example there is a considerable reduction in setup time in the startup steps of new lines and of recalibrating of the line in the steps of introduction of changes in the product or process or changing suppliers of parts (for example changes of sheet metal lots). The basic reduction in downtime of the process for resetting or maintenance action following failures is also obvious. In addition, there is a considerable improvement and stabilization in the quality of the product with holding of the process quality level and in particularly in the presence of intrinsically unstable or geometrically delicate processing such as for example laser welding.

There is also reduction in the production of rejects or resumption of processing and a much better controlled and hence stable production flow with events of internal and external perturbation.

Naturally the above description of an embodiment applying the innovative principles of the present invention is given by way of non-limiting example of said principles within the scope of the exclusive right claimed here. For example the number, type and arrangement of processing stations and measurement means can be the most varied depending on specific practical requirements.

What is claimed is:

1. In a plant made up of a plurality of automated stations for the performance of an assembly process for body parts with there being in the stations automatic means for support and blocking of the parts to be assembled and automatic assembly means for the supported and blocked parts a method for identification and management of errors and defects comprises:
   a. preliminary analysis steps comprising the steps of:
      determining measurement points sensitive to the movement of constraint points which comprise support and blocking points for the parts in the stations, and
      determining correlations between measurements detectable in said measurement points sensitive to said movement and possible causes which might generate such movement;
   b. inline diagnostic steps comprising the steps of:
      overseeing any movements in the previously identified measurement points and in this case tracing back to the possible causes of the movements, and
      signaling such possible causes to allow their elimination if desired or necessary.

2. Method in accordance with claim 1 comprising the steps of:
   arranging sensors for measurement of geometric magnitudes of the parts in established reading points,
   realizing a mathematical structural model of the parts assembled in the various stations,
   applying to the model a trial and error method comprising application to the model of a plurality of possible stresses and determining which among the plurality of stresses are those which give in the model deformations which approach most the deformations detected practically in the measurement points, and
   using the distribution of stresses thus identified to obtain the stress points which generated it in practice in order to supply a diagnosis of the defects or errors of assembly in the plant.

3. Method in accordance with claim 2 in which the mathematical model is a simplified model in which the nodes of the model are reduced to points of constraint and application of stresses comprising the points of support and blocking of the parts in the stations and to said points of reading.

4. Method in accordance with claim 2 in which from the distribution of stresses thus identified is taken one or more distributions of corrective stresses to be applied in the stations and intended to compensate for the deformations detected in practice in order to supply therapy for the defects or errors of assembly in the plant.

5. Method in accordance with claim 4 in which, if there are more distributions of stresses tending to compensate for the deformations, from among these is selected as distribution of stresses to be used in practice the one which optimizes previously identified parameters.

6. Method in accordance with claim 5 in which the parameters to be optimized are chosen from among minimization of the residual deformations after correction, minimization of the number of corrective stresses to be used, minimization of the overall number of corrective stresses to be applied, and minimization of the internal tensions induced by the corrective stresses.

7. Method in accordance with claim 3 which for choice of the reading points comprises the steps of:
   using a structural model of the parts to ascertain zones defined by a series of points of sensitivity for each cause of stress or possible combinations of stresses it is desired to measure,
   distinguishing the zones defined in relation to the causes associated with them, and
   applying to the distinguished zones the trial-and-error method to define optimal measurement "zones" by positioning virtually the sensors in the zones previously distinguished and calculating the number of causes measurable so as to find in which positions the sensors measure the highest number of causes.

8. Method in accordance with claim 7 in which are simulated all the possible positionings of sensors and an optimal solution consisting of the complex of sensors which ensures maximization of the number of causes measurable and minimization of the number of sensors used.

9. Method in accordance with claim 4 which, to determine whether and to what degree the position of previously identified points of the assembled parts are sensitive to the movement of constraint points in a station before their assembly, comprises the steps of:
   detecting the trend of the dispersal of the geometrical errors in said preascertained point before and after the assembly operation,
   examining the "correlation" and "linear regression line" between the input and output of said dispersal, and
   defining the preascertained point as the more "sensitive" as the correlation between input and output is lower and the further the inclination of the linear regression line from 45°.

10. Method in accordance with claim 4 which to determine the amount of the movement of a constraint point to be imposed in a station to permanently change the position of a preascertained point of parts assembled in the station comprises the steps of:
    measuring the trend of the dispersal of the geometrical errors in said preascertained point before and after the assembly operation,
    examining the "linear regression line" of said dispersal between input and output, and
    imposing on the constraint point a movement "s" equal to $$s=y/(1-m)$$

with x being the measurement at input, y the measurement at output and m the angular coefficient of the regression line.

11. Method in accordance with claim 4 which to trace points of the process responsible for errors and defects comprises the steps of:
    calculating the typical trend of the systematic errors along the process which will be called "process signature",
    defining the ideal process signature termed "zero signature" which leads to having zero errors on the assembled part at the end of the process,
    receiving from the measurement sensors of the stations current dimensional data on the parts and calculating therefrom the present process signature, and
    using the deviations of the present process signature from the zero signature to ascertain the process points responsible for errors and defects.

12. Method in accordance with claim 3 which to realize the geometrical reconstruction of the assembled part comprises the steps of:
 a. making congruent measurements taken in different stations on a same part by structural analysis and "best fitting",
 b. taking from the measurements local shape data on parts to be assembled and extracting therefrom local shape error data,
 c. taking from the measurements general data on the positioning geometry of the parts and taking them on the parts along the plant, and
 d. processing the local shape data and the general geometry data taken above and reconstructing the general geometry of the parts by structural analysis using as starting geometrical data the local shape error data taken in step b above and as constraints the positioning data of the parts taken in step c.

13. Plant made up of a plurality of automatic stations for the performance of an assembly process of body parts with their being in the stations automatic support and blocking means for the parts to be assembled and automatic assembly means for the parts supported and blocked and comprising in the stations measurement sensors in established measurement points for measurement of geometrical magnitudes of the parts in assembly with the measurement data taken by the sensors being received by a processing unit which takes any deformations of the parts in the various stations and goes back from the detected deformations to the causes thereof in the assembly process and emits a diagnosis signal of the presumed cause.

14. Plant in accordance with claim 13 characterized in that in the processing unit is memorized a simplified mathematical structural model of the parts assembled in the various stations in which the nodes of the models are reduced to points of constraint and application of stresses which comprise the support and blocking points of the parts in the stations and said measurement points with the central unit applying to the model a plurality of possible stresses and determining which among the plurality of stresses are those which give in the model deformations which most approach the deformations detected by the sensors in practice.

15. Plant in accordance with claim 13 characterized in that in the stations there are means which can operate on its pieces in assembly to supply correction of the deformations detected.

\* \* \* \* \*